July 16, 1957  J. W. FITZGERALD ET AL  2,799,788
PIEZOELECTRIC BLAST GAGES

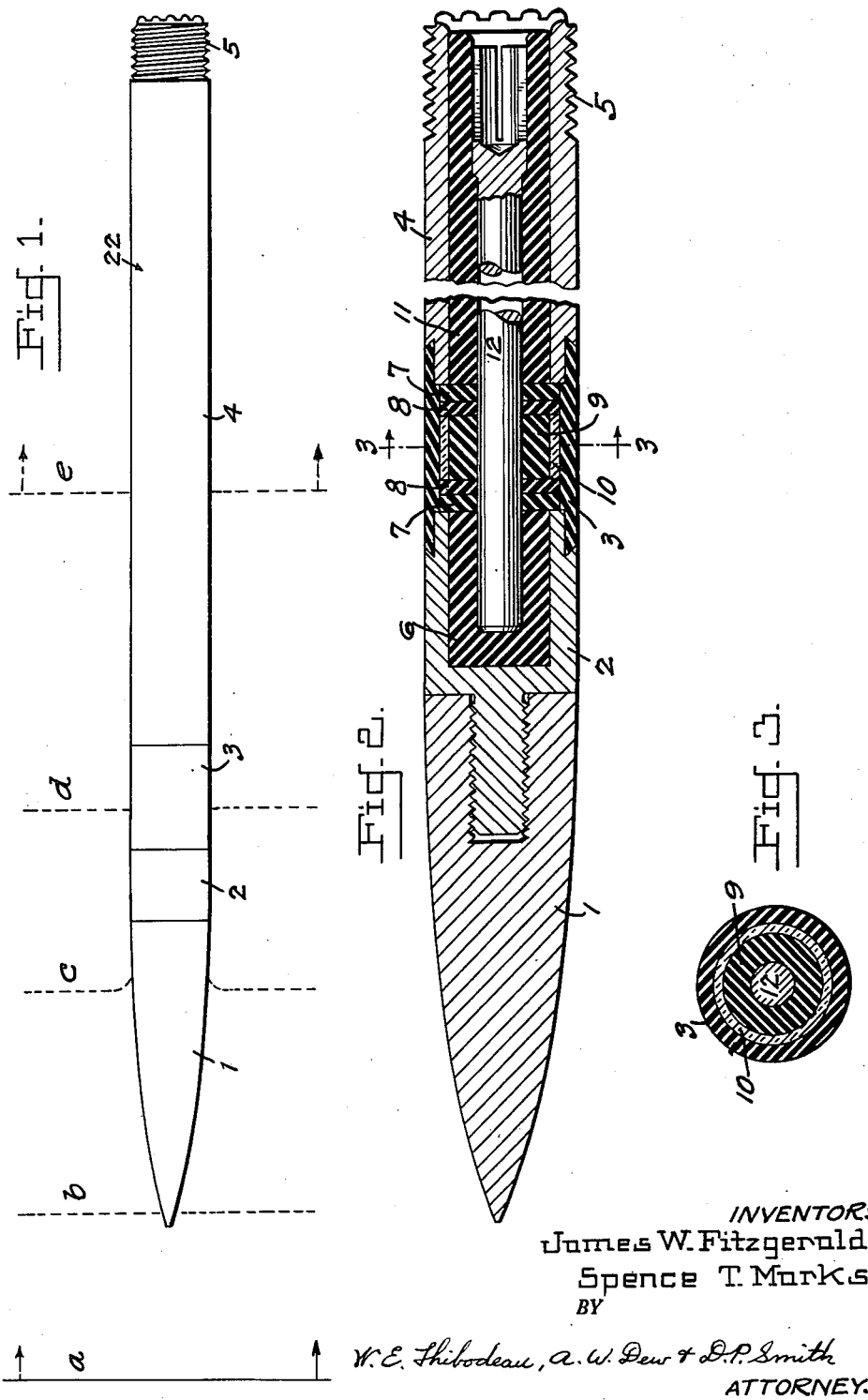

Filed Nov. 16, 1954 2 Sheets-Sheet 2

INVENTORS
James W. Fitzgerald
Spence T. Marks
BY
W. E. Thibodeau, A. W. Dew & D. P. Smith
ATTORNEYS United States Patent Office 2,799,788
Patented July 16, 1957

2,799,788

PIEZOELECTRIC BLAST GAGES

James W. Fitzgerald, Arlington, Va., and Spence T. Marks, Aberdeen, Md., assignors to the United States of America as represented by the Secretary of the Army Application November 16, 1954, Serial No. 469,324

7 Claims. (Cl. 310—8.3)

The invention described herein may be manufactured and used by or for the Government for governmental purposes without the payment of any royalty thereon.

This invention relates to electro-acoustic transducers, and more particularly to methods and devices for converting transient fluid pressures into corresponding electrical effects. It pertains specifically to piezoelectric gages for measuring the instantaneous pressures associated with blast or shock waves propagated in gases or liquids.

Previous blast pressure gages usually depended upon the piezoelectric effects of natural crystals such as tourmaline and quartz. In a typical design the sensitive element consisted of a stack of tourmaline discs cemented together and electrically connected in parallel. The stack of discs was often embedded in an insulating resin and encased in either a pill-box shaped or cylindrical metal housing. One face of the housing was open or, in some instances, covered with a thin diaphragm in intimate contact with the resin. In another known form the stack was mounted on the inside face of the housing, with the diaphragm in direct contact with the other face of the stack. In this case no potting resin was used. In still other designs the diaphragm has been replaced by a plate, or, in some cases, a piston.

Gages of the foregoing types have several disadvantages that result in electrical outputs that are more or less distorted from the pressure-time sequence of the initiating shock wave. In use, such gages are mounted "face-on" to the oncoming shock wave, i. e., with the flat open face of the housing toward the blast. Consequently the shock wave in traversing the non-streamlined gage housing, is greatly distorted. This means that the transient pressure applied to the sensitive element is not simply related to the undisturbed or free-field pressure of the shock wave. Moreover, the basic phenomenon of any "face-on" pressure measurement depends upon physical laws controlling the reflection of shock waves at solid surfaces. In general, such reflection of a shock results in a considerable increase of pressure at the surface and the resulting output from a piezoelectric element is again not simply related to the free-field pressure of the shock wave.

Another disadvantage of blast pressure gages of previous designs results from the pyroelectric properties of tourmaline. The temperature of a shock wave, particularly in gases, is quite high due to adiabatic compression, and in passing over the sensitive element gives rise to electrical outputs. Such outputs tend to obscure the effects due solely to the pressure of the shock wave.

Other disadvantages of previous blast pressure gage designs include (a) excessive shock transit time, (b) insufficient band width, (c) excitation of spurious vibrational housing modes, (d) difficulties in fabrication, (e) leakage during continuous field use, and (f) high incidence of failure under the rugged testing conditions.

It is, accordingly, a primary object of our invention to provide improved methods and apparatuses for use in the observation and measurement of shock waves or blast pressures in fluids. It is a further object of our invention to provide means for measuring transient pressures of a shock wave without undue perturbation of the pressure field. It is a still further object of our invention to provide a method and apparatus for measuring the transverse transient pressure rather than the face-on pressure of a shock wave. It is a specific object of our invention to provide a method of mounting the sensitive element of a piezoelectric blast pressure gage so that it is subjected to essentially the free-field pressure of the shock wave. Another specific object of our invention is to provide a method of mounting the sensitive element of a piezoelectric blast pressure gage so as to minimize coupling into unwanted vibrational modes of the gage housing while at the same time providing a sufficiently rugged mounting to withstand the impact of the shock wave.

Other objects and advantages of our invention will become apparent in our description of the design features and method of operation contained herein.

Our invention utilizes a piezoelectric sensitive element for a blast pressure gage that has sufficiently broad frequency responses to accurately reproduce the pressure-time sequence of a shock wave.

Briefly, our invention is based on the use of a piezoelectrically active, barium titanate, cylindrical shell mounted in, but electrically isolated from, a pencil-shaped, streamlined housing. In use, the shock wave propagates normally over the streamlined housing without appreciable disturbance, and the sensitive element measures the transverse pressure of the shock wave. This corresponds very nearly to the free-field pressure of the wave.

Figure 1 is a longitudinal elevation of our novel blast pressure gage showing the manner in which a shock wave passes over the streamlined housing.

Figure 2 is an enlarged elevation in section showing a preferred form of our invention.

Figure 3 is a cross section taken on line 3—3 of Figure 2 and looking in the direction of the arrows.

Figure 6:
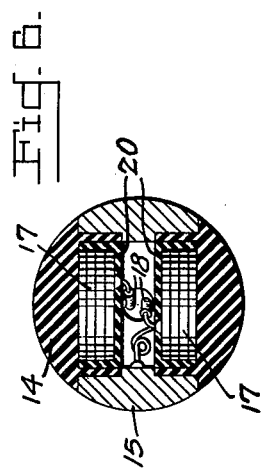
Figure 6 is a cross section taken on lines 6—6 of Figure 5 and looking in the direction of the arrows.

Referring now to Figure 2, a barium titanate cylinder 10 is mounted on a brass spindle 12 by means of a sleeve 9 of a resilient material consisting of small particles of cork cured into a rubber matrix. The combination of the sleeve 9, the washers 7 of the same material, and neoprene washers 8 serve to mount the cylinder in position coaxially in the streamlined housing, while at the same time electrically and mechanically isolating it from the housing. The conducting center spindle 12 and the insulating phenolic sleeve 11 are first assembled into the metal housing 4 by either press-fitting, cementing, or molding. Then the barium titanate cylinder 10, together with the washers 7 and 8 on each end, and the sleeve 9 are slipped over the end of the spindle and positioned as shown. At this point a flexible jumper-wire (not shown) is soldered from the outer cylinder electrode to the housing 4, forming the grounded terminal. Another wire from the inner cylinder electrode is similarly soldered to the center spindle. The metal end cap 2, with its insulating phenolic liner 6, is press-fitted or cemented onto the end of the spindle 12 as shown. The other end of the center spindle 12 terminates in slotted spring-contact fingers so as to form, with the standard thread 5, a standard female coaxial connector.

The subassembled gage is now ready for the neoprene coating 3. This may be accomplished by means of successive coats of a neoprene curing cement with the proper accelerator added. Sufficient time between coats must be allowed for solvent evaporation. The barium titanate cylinder, washers, and the recessed shoulders of the housing are usually first coated with a suitable priming cement. After sufficient thickness has been built up by successive coats, the gage is inserted in the mold, pressure and heat applied, and the neoprene sheath is cured in place. A suitable cure can be effected at 70° C. for two days, more or less.

After curing of the neoprene sheath 3, the removable metalogive-shaped streamlined nose 1 is installed by means of a suitable thread on a portion of reduced diameter of the end piece 2.

Minor variations of this construction will be evident to those skilled in the art. For example, a two-pin connector construction could be used, with two insulated leads coming from the cylinder, instead of the coaxial construction as shown. The nose 1, end cap 2, and main housing 4 could be of some material other than metal, such as a suitable plastic. The nose 1 need not necessarily be removable, nor is the exact shape critical, so long as there are no abrupt changes in curvature. Other resilient materials could be used for the sleeve 9 and the washers 7 and 8, so long as they serve the purpose of mechanically and electrically isolating the sensitive cylinder 10 from the housing. There are also a number of modified barium titanate bodies, with calcium titanate or lead titanate added, for example, that can be suitably polarized so as to exhibit piezo-electric properties. There are also a number of other natural and synthetic rubbers and elastomers that can be successfully used for the waterproof sheath 3. The neoprene sheath described above is capable of being cured below the Curie point of barium titanate, and therefore does not effect the polarization of the cylinder. However, for those sheath materials that cure or mold above the Curie point (approximately 120° C.), the barium titanate cylinder can be polarized after molding.

Figure 5:
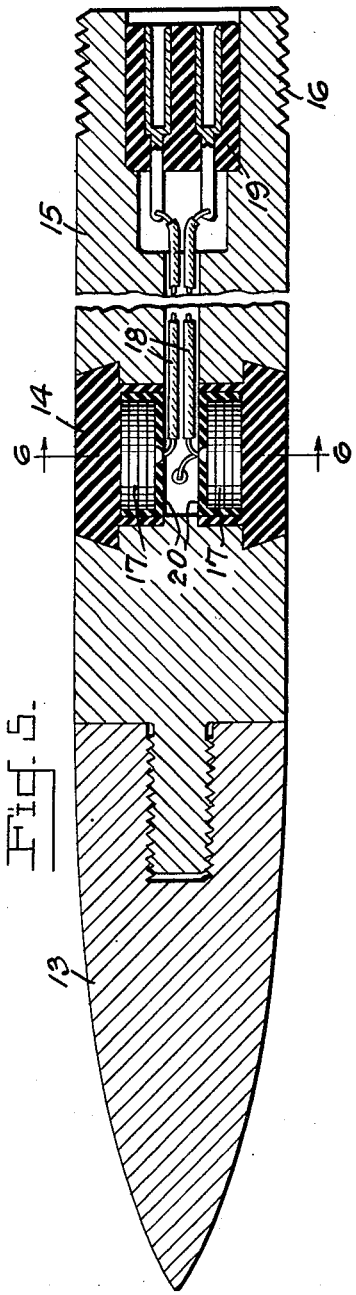
Figure 5 is an enlarged elevation in section showing an alternative species of our invention.

Another somewhat more basic variation of our invention is shown in Figures 5 and 6. Here the cylinder is replaced by two consolidated stacks of barium titanate discs 17 with electrodes connected in parallel and located in transverse holes in the streamlined housing 15. Phenolic liner 20 insulates the stacks from the housing. Two insulated leads 18 are connected to pins of a standard two-contact connector 19 through holes in the housing. The thread 16 is standard to mate with the corresponding cable connector. After subassembly, a molded neoprene sheath 14 is bonded in place in the manner previously described. The ogival nose 13 is removable. Other piezo-electrically active materials such as tourmaline or quartz can be used in place of the barium titanate discs.

Figure 4:
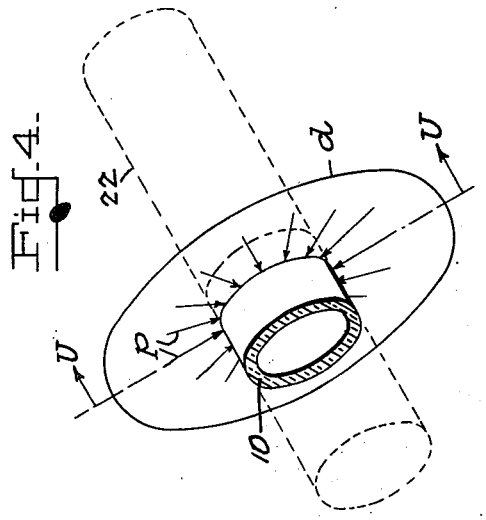
Figure 4 is a perspective view showing the application of transverse pressure on the sensitive element.

The manner of operation of our invention is shown in Figures 1 and 4. Figure 1 shows how a shock wave propagates across our blast pressure gage. The positions $a$, $b$, $c$, $d$, and $e$ are successive locations of a shock front traveling to the right at a velocity U along the axis of the gage 22. At position $c$ a slight curvature of the shock front (greatly exaggerated for pictorial purposes) is observed at the surface of the nose. This results from the compression caused by the sidewise displacement of the shock—a necessary consequence of the conservation of momentum. The increase in pressure near the surface of the nose causes the shock wave to propagate at a higher velocity, resulting in a curved wave front. In the transition from the ogival nose to the cylindrical housing, the opposite effect (i. e., expansion) occurs and the shock front tends to straighten out.

Viscous effects also tend to straighten the shock front and, by the time it has reached the sensitive element (position $d$), the distortion has disappeared and the sensitive element "sees" an undisturbed shock front. In Figure 4 a portion of a shock front at a position such as $d$ is shown traversing the barium titanate cylinder 10. The transverse pressure $p$ is applied to the exterior of the cylinder, resulting in an electrical charge being generated between the outer and inner electrodes of the cylinder 10.

Figure 7:
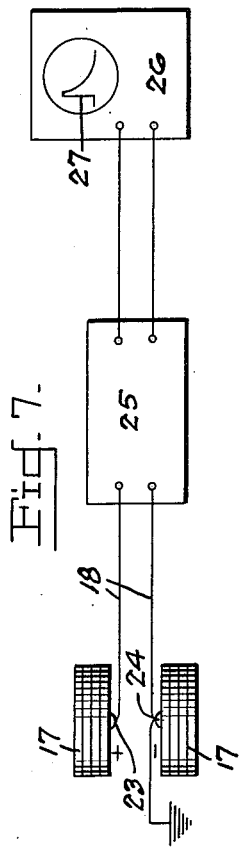
Figure 7 is a schematic wiring diagram of measuring apparatus using our novel gage for the sensitive element.

Figure 7 shows a typical schematic diagram of a setup used for observing shock waves. The electrodes 23 and 24 of the barium titanate crystals (mounted, of course, in the gage housing as described above) are connected to an amplifier 25 and thence to the vertical electrodes of a single-sweep oscilloscope 26. Usually the outer electrode 23 is connected to the grounded side of the system for electrostatic shielding purposes. The instantaneous transverse pressure $p$, when applied to the stacks, generates a voltage E which is amplified and appears as a sweep-trace 27 on the oscilloscope cathode ray screen. Usually such a trace is photographed for measurement and analysis later.

The principal advantage of our invention is, of course, the fact that perturbations of the local pressure field due to the interaction of the shock wave and the gage housing are reduced to a negligible amount.

Another advantage arises from the wide frequency response of our gage. In practice, for shock waves in gases a frequency band-pass from a few c./s. through 100 kc./s. is usually sufficient. Somewhat higher frequencies are desirable for shock waves in liquids. We have made the frequency response of our blast pressure gages flat over such a range by ($a$) making the length of the cylinder sufficiently short so that the corresponding longitudinal mode has a frequency sufficiently above the required band pass, ($b$) making the diameter of the cylinder sufficiently small so that the corresponding radial mode has a frequency sufficiently above the required band pass, ($c$) mounting the cylinder by means of resilient spacers so that spurious vibrational modes of the housing do not couple into the cylinder, and ($d$) making the cylinder wall thickness sufficiently thin so that the reciprocal of the product of its capacitance and the leakage resistance of the gage is sufficiently small.

Furthermore, we have reduced errors due to the integrating effect associated with the shock front transit time along the cylinder to an acceptable minimum by making the length of the cylinder sufficiently short. For example, the blast pressure gage constructed as described above, using a barium titanate cylinder approximately ½ in. in diameter×¼ in. long×1/32 in. wall thickness gives a substantially flat frequency response from ½ c./s. to 100 kc./s. Such a gage can have an output charge sensitivity in the vicinity of 800 $\mu\mu$c./p. s. i., a capacitance of about 0.003 $\mu$fd., and a leakage resistance of higher than 500 megohms. The general dimensions, of such a gage design are: overall length $L_1$, 10 in.; length of ogive nose $L_2$, 2½ in.; and diameter of gage housing D, ⅝ in.

We have further reduced distortion due to pyroelectric effects by means of a thermally insulating neoprene sheath. With the cylinder and housing dimensions given above, the molded neoprene sheath is approximately 1/16 in. thick, and reduces pyroelectric response of the gage due to a shock wave transversing it to a negligible amount. Moreover, the bonded neoprene sheath withstands repeated and continuous immersion without leakage even after extended periods of time.

Other advantages of our invention include simpler construction, higher sensitivity, lower impedance, and more rugged construction.

Additional advantages of our method and apparatus will be apparent to those skilled in the art, as well as further modifications thereof. The invention is not intended to be limited in any phase except as controlled by the prior art and the appended claims.

We claim:

1. A gage adapted to measure transverse transient pressure of a shock wave without undue perturbation thereto comprising in combination, a gage body, said body having a nose section including a streamlined ogive portion of low aspect ratio to gradually compress said shock wave, said ogive terminating in a cylindrical nose portion coextensive and integral with said ogive, a pressure sensitive piezoelectric means affixed to the end of said cylindrical nose portion, a sound window coextensive with said cylindrical nose portion and integrally overlying said pressure sensitive means whereby the distortion of said shock wave over said ogive portion due to compression thereof is neutralized over said cylindrical nose portion before reaching said sound window, said sensitive means attached to a main housing section and coextensive therewith whereby said gage is mounted for presentation to said shock wave.

2. The invention as set forth in claim 1 wherein said pressure sensitive piezoelectric means comprises a cylindrical crystal of barium titanate coaxial with said gage body.

3. The invention as set forth in claim 1 wherein said sensitive element comprises a stack of piezoelectric crystals.

4. The invention as set forth in claim 1 wherein said sensitive element comprises a plurality of stacks of piezoelectric crystals arranged parallel to each other and in chordal relation to said housing.

5. A gage adapted to measure transverse transient pressure of a shock wave without undue perturbation thereto comprising a gage body, said body having a nose section including a streamlined ogive portion of low aspect ratio to gradually compress said shock wave, said ogive terminating in a cylindrical nose portion coextensive and integral with said ogive to allow distortion due to said compression to be neutralized, a cylindrical pressure sensitive piezoelectric crystal affixed to the end of said cylindrical nose portion and coaxial therewith, an annular sound window overlying said crystal and coextensive with said cylindrical nose portion, said sensitive means attached to a cylindrical main housing section and coextensive therewith whereby said gage is mounted for presentation to said shock wave, and means to mechanically and electrically insulate said crystal from said gage body.

6. The invention according to claim 5 wherein said piezoelectric crystal is barium titanate.

7. A gage adapted to measure transverse transient pressure of a shock wave without undue perturbation thereto comprising the combination including a cylindrical open ended main housing section having a threaded portion on one end thereof, a hollow phenolic insulating sleeve fixed to the inner surface of said main housing section, a conducting spindle fixed within said insulating sleeve, said spindle extending a predetermined distance outwardly from said housing, the other end of said spindle terminating in slotted spring-contact fingers within said main housing adjacent said threaded end, a pressure sensitive piezoelectric barium titanate cylinder mounted on a portion of said outwardly extending spindle and radially spaced therefrom by an insulating resilient sleeve fixed to the inner wall of said piezoelectric cylinder and to the circumference of said spindle portion, said piezoelectric cylinder being mechanically and electrically insulated from said main housing by said resilient sleeve and a pair of washers between said piezoelectric cylinder and said main housing and in abutting relation thereto and with each other, a second pair of mechanically and electrically insulating washers abutting the other side of said piezoelectric cylinder to mechanically and electrically insulate said cylinder from a nose section of said housing having an end cap including a streamlined ogive nose portion integral therewith, said end cap having a bore at its end opposite said ogive, said bore having a second phenolic insulating sleeve fixed to the internal side and end walls thereof, said second insulating sleeve affixing said nose section to said spindle portion extending beyond said second pair of insulating washers and in abutting relation therewith, a neoprene sound window overlying said piezoelectric cylinder and in intimate contact therewith, said window being coextensive with the circumferential surface of said main housing and said end cap, an electrical conductor from the outer conducting surface of said piezoelectric cylinder to said main housing, and an electrical conductor from the inner conducting surface of said piezoelectric cylinder to said conducting spindle.

References Cited in the file of this patent

UNITED STATES PATENTS

| | | |
|---|---|---|
| 2,315,756 | Warner | Apr. 6, 1943 |
| 2,447,333 | Hayes | Aug. 17, 1948 |
| 2,486,146 | Frondel | Oct. 25, 1949 |
| 2,618,698 | Janssen | Nov. 18, 1952 |